United States Patent [19]

Abrams et al.

[11] 4,413,908
[45] Nov. 8, 1983

[54] SCANNING INTERFEROMETER CONTROL SYSTEMS

[75] Inventors: David E. Abrams, Winchester; Raul Curbelo, Lexington; R. Brough Turner, Newton Corner, all of Mass.

[73] Assignee: Bio-Rad Laboratories, Inc., Richmond, Calif.

[21] Appl. No.: 354,934

[22] Filed: Mar. 5, 1982

[51] Int. Cl.³ .............................................. G01B 9/02
[52] U.S. Cl. .................................... 356/346; 318/640
[58] Field of Search ........................ 356/346; 318/640

[56] References Cited

U.S. PATENT DOCUMENTS 3,488,123  1/1970  Nichols ............................... 356/346
3,634,682  1/1972  Gold .............................. 318/640 X
4,138,727  2/1979  Mantz .............................. 356/346 X Primary Examiner—William L. Sikes
Assistant Examiner—Matthew W. Koren
Attorney, Agent, or Firm—Schiller & Pandiscio

[57] ABSTRACT

A scanning interferometer is provided with a substantially monochromatic reference beam having a wavelength outside the spectral region of principal interest. Modulation of the reference beam provides a measure of the scan velocity that is compared with a stablized time reference to provide an error signal used to regulate the scan velocity. Modulation of the reference beam also provides a fringe count. At a predetermined count, the time reference is changed in a pre-arranged manner, providing a pre-established scan acceleration sequence at the end of each scan. The acceleration sequence is selected to insure the direction of the scan is reversed within a quarter wave interval of the fringe count, insuring the fidelity of the fringe-count of the monochromatic reference source.

2 Claims, 1 Drawing Figure

SCANNING INTERFEROMETER CONTROL SYSTEMS

BACKGROUND OF THE INVENTION

This invention relates to scanning interferometers, and more particularly to a method and apparatus for accurately controlling the excursion of the cyclicly moving element in a scanning interferometer, such as the moving mirror in a Michelson intereofometer.

Scanning interferometers are well known, and are employed, for example, in spectrometry and metrology. Thus, in multiplex spectrometry, a plurality of spectral intensities—each corresponding to a resolvable spectral interval—are simultaneously observed by a single detector, each spectral wavelength or frequency being differently encoded so that the spectrum may be transmitted over a single information channel and subsequently retrieved through a decoding process. A particularly elegant method for accomplishing the encoding makes use of a Michelson interferometer with a cyclicly moving mirror. Electromagnetic radiation passing through the interferometer is divided by a beam splitter so as to follow a pair of paths. One path is reflected by a fixed mirror, and the other, from the moving mirror. The two paths are then recombined at the beam splitter. As a result of interference, each wavelength of the recombined radiation is modulated at a different frequency, the frequency depending upon the wavelength and the velocity of the moving mirror. Individual wavelengths can be discriminated from one another by frequency filtering, the amplitude of each frequency being proportional to the intensity of the radiation at the optical wavelength or frequency corresponding to the modulation frequency. Commonly, the spectrum is extracted from the observed interferogram (i.e., the radiation intensity as a function of optical wavelength or frequency is deduced from the observed signal intensity as a function of mirror position) by numerically performing a Fourier transform.

While somewhat more sophisticated than conventional (i.e., dispersive) scanning spectrometry, multiplex spectrometry enjoys a number of advantages. For instance, as is well known, a multiplex spectrometer in effect observes each resolution element for half of the total observing time, as compared to the fraction 1/n (where n is the number of resolution elements) of the total time, as is the case for a conventional scanning spectrometer. In the case of a system which is detector noise limited (as is common in infrared spectrometry), this n/2 advantage in signal leads to a signal-to-noise advantage of $(n/2)^{\frac{1}{2}}$, an improvement known as the multiplex or the Fellgett advantage. Additionally, the Michelson interferometer enjoys an optical throughput (i.e., a field of view-aperture area product) advantage compared to slit spectrometers.

The resoluation obtained by a scanning Michelson interferometer is dependent upon the total excursion of the moving mirror, a larger resolution requiring a larger excursion. The accuracy of the representation of the spectrum depends upon the accuracy of the determination of the interferogram. This in turn requires an accurate determination of the varying retardation (i.e., the changing difference in path length travelled by the two portions of the split beam caused by the motion of the moving mirror). The interferogram ideally is an accurate replica, at a much lower range of frequencies, of the intensity pattern of the train of wave fronts incident upon the aperture of the interferometer. This ideal can be realized by an interferometer in which the moving mirror is translated at a uniform velocity for an infinite distance. In practice, the velocity need not be constant, provided that it is reasonably well-behaved and known. Nor need the retardation become infinite, provided that its limits, relative to zero retardation (i.e., relative to the condition of equal path lengths for the two beams) are also known. Indeed, it is common practice in interferometric spectrometry to limit the observations to values of the retardation between some positive and negative maximum retardations (corresponding to the desired resolution) not necessarily symmetrically located about zero retardation. Implicit in such a practice is the realization that an ideal interferogram of a constant source is symmetric about zero retardation.

As is well known in the art, the velocity or incremental displacement of the moving mirror may be readily sensed by simultaneously observing, along with the spectral source of interest, a monochromatic reference source, such as a laser. For the ideal interferometer with a constant velocity mirror, monochromatic radiation exhibits a sinusoidal interferogram, the period of the sinusoid corresponding to a change in retardation equal to the wavelength of the monochromatic source. In the case of a Michelson interferometer, this corresponds to a displacement of the moving mirror equal to one half a wavelength of the monochromatic radiation. For a non-uniformly moving mirror, corresponding signal intensities of successive cycles of the reference interferogram produced by the modulation of a monochromatic source still mark integral wavelength retardation differences, provided, of course, that the mirror velocity does not change sign in the interim. The reference interferogram may be obtained either through a reference interferometer mechanically coupled to the principal interferometer, or directly through the principal interferometer, the latter approach using a monochromatic source and associated detector chosen so as to be outside the wavelength region of the spectrum of interest.

Additionally, zero retardation must also be measured. Prior art rapid scanning interferometers require a determination of zero retardation for each scan, since the deceleration and reversal of the motion of the moving mirror occupies a time period considerably greater than that required to move the mirror through one or more fringes (i.e., cycles) of the reference interferogram. For instance, mirror velocities between 1 and 50 mm/sec are commonly employed, and typically a few hundred fringes are passed in decelerating the mirror. Consequently, the value of the retardation at reversal is not known within a wavelength of the reference radiation, and the fringe count of the reference interferogram is lost, it being impossible to determine if successive fringes arise from motion of the mirror in the same or in opposite directions. In prior art interferometers, zero retardation is commonly sensed by observing a broadband source through an auxiliary interferometer mechanically coupled to the principal interferometer. At zero retardation, all wavelengths constructively interfere, so that a spectrally broad-band source will exhibit an interferogram with a maximum peak (a so called "white light burst"). It will be appreciated that the requirement for a separate interferometer mechanically coupled to the principal interferometer complicates and adds to the expense of a scanning interferometer.

An alternative approach is in the use of a pair of monochromatic signals of the same wavelength and substantially in phase quadrature with one another. Separate detection of each signal allows scan reversal to be unambiguously detected, and the velocity and direction of scan to be measured throughout the scan. Such dual phase reference beam systems require only an initial determination of zero retardation when the system is initialized. While this approach may be realized using only one interferometer, it will be appreciated that dual phase monochromatic sources also represent a complication and a cost burden to scanning interferometer systems.

Accordingly, it is an object of the present invention to provide a scanning interferometer that does not require an auxiliary interferometer to sense the zero retardation condition of the moving element or a dual phase reference source to unambiguously sense velocity reversal. Additionally, it is an object of the present invention to provide a scanning interferometer in which the retardation is continuously monitored.

BRIEF DESCRIPTION OF THE INVENTION

These and other objects are met in the present invention of a control system for a scanning interferometer in which a single monochromatic source having a wavelength outside the spectral region of interest is modulated by the interferometer. The period of the modulation of this beam is compared with a stabilized time reference to provide an error signal used to regulate the scan velocity. Modulation of the reference beam also provides a fringe count. At the end of each scan, as determined by this count passing a preset limit, a pre-established acceleration sequence is used to reverse the motion of the scanning element within a quarter wave interval of the fringe count, insuring fidelity of the fringe count, once set.

In a preferred embodiment, the system incorporates a reference detector viewing the monochromatic source through the scanning interferometer optics and providing a signal to a zero-crossing detector in the form of a pulse for each passage of the (ideally) sinusoidal signal across an (ideally) average signal level. This pulse is used to initiate the count of a periodic pulse-train having a frequency that is a large multiple of the desired modulation frequency of the monochromatic reference beam. A resettable counter, initially set for a predetermined number of counts of the high pulse rate signal, provides a time interval that is compared with the interval between successive zero crossings of the signal from the monochromatic source. In the preferred embodiment, this time comparison is accomplished by producing and averaging a pulse train, each pulse being initiated in response to the detection of a zero crossing of the modulated monochromatic reference signal and having a pulse duration equal to a half of the desired interval between zero crossings of the reference signal. The time-average value of this pulse train provides an error signal that is used to control the velocity of the moving mirror.

The zero-crossing signals of the reference beam are also used to index a reversible up/down counter that may be zeroed by a zero retardation signal secured from initial observations of a broad-band source (typically, the sample beam) through the principal interferometer. When the count in this counter reaches a predetermined value, selected on the basis of the desired maximum retardation (i.e., the maximum resolution desired) a pre-determined control sequence is initiated, changing the length of the pulses in the pulse train being compared with the zero-crossings of the reference signal. As a result, the error signal provided the scan control is changed, accelerating the scanning element accordingly. The pre-determined sequence is selected so as to controllably decelerate the scanning element after it passes the extreme of its desired excursion, bringing the element to a velocity from which its direction of motion may be readily reversed within one quarter of a wavelength of the monochromatic radiation used as the reference. The scanning element having been decelerated is then reversed upon detection of a zero crossing of the reference signal, the reverse taking effect before the next zero crossing may occur. At the same time, the direction of counting in the up/down counter is also reversed.

A running count of the retardation of the moving mirror may thus be maintained without the need for repeated determinations of zero retardation. Consequently, a separate reference interferometer is not required to produce a sequence of white light bursts. Nor is a dual-phase monochromatic source required.

Other objects of the present invention will in part appear obvious and will in part appear hereinafter. The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWING

For a fuller understanding of the nature and objects of the present invention, reference should be had to the following detailed description taken in connection with the accompanying drawing wherein.

DETAILED DESCRIPTION OF THE DRAWING

Figure 1:
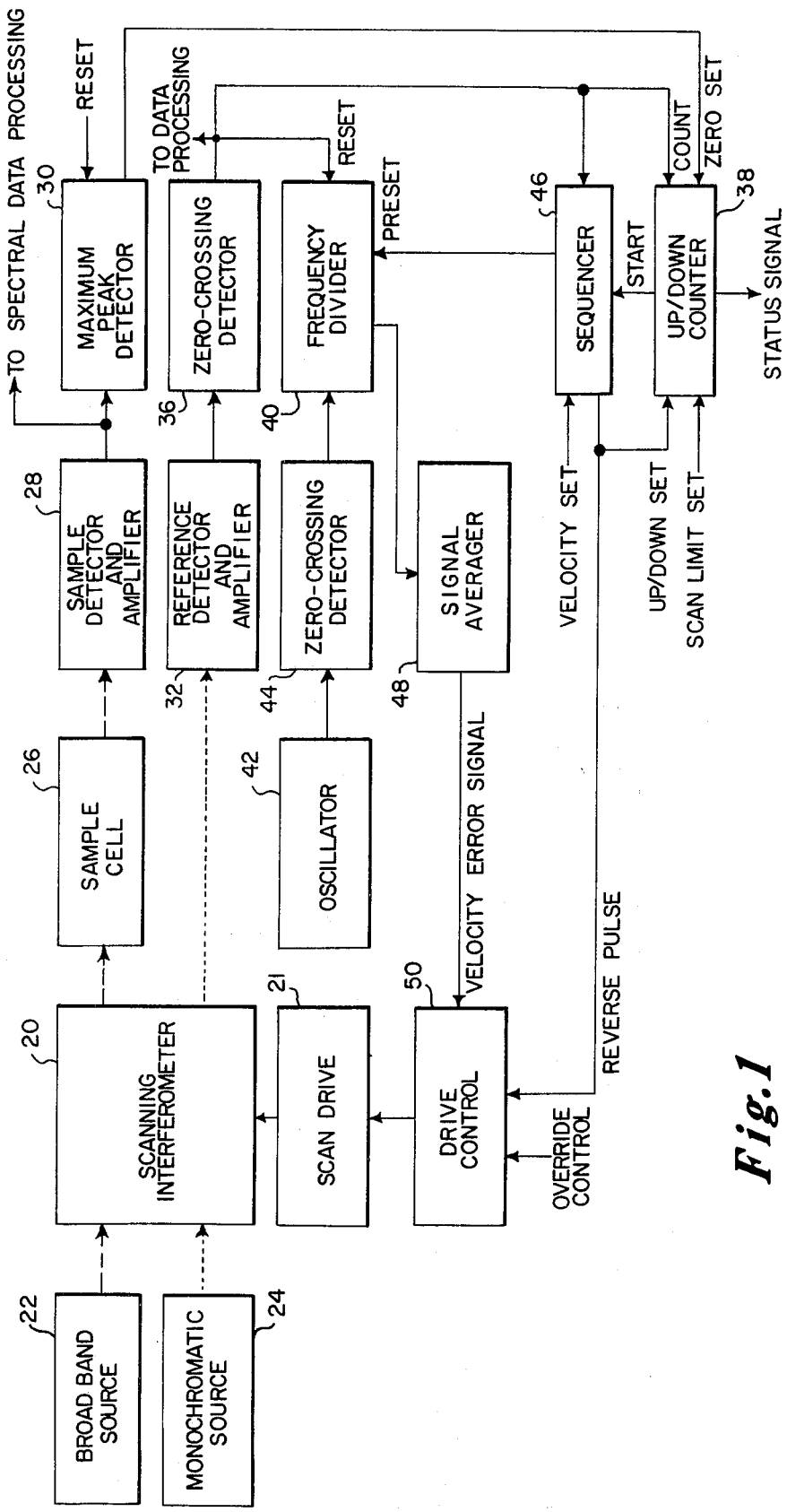
FIG. 1 is a block diagram indicating the relation between components of the present invention and indicating the flow of signals therebetween.

Referring to FIG. 1, there is may be seen a block diagram of a Fourier transform spectrometer made in accordance with the principles of the present invention. In the preferred embodiment, the present invention incorporates a Michelson scanning interferometer 20 comprising, as is well known in the art, a beam splitter and a pair of mirrors (not shown) so disposed as to divide incident electromagnetic radiation into a pair of beams traversing different optical paths, one of which is made to be variable. To this end, one of the mirrors is made to reciprocate, the motion being supplied by scan drive 21, typically a linear motor. The moving mirror and drive 21 are so arranged that the mirror excursion may exceed the largest excursion desired on either side of the preferably centered zero retardation position, the end points of the excursion being established by appropriate stops (not shown).

Scanning interferometer 20 intercepts and modulates radiation from broad band source 22 and monochromatic source 24. Typically, broad band source 22 is a globar or similar substantially uniform source of extended wavelength coverage. Monochromatic source 24 is a source of narrow wavelength coverage, typically a laser, selected to have a wavelength preferably smaller than the wavelengths of interest produced by broad band source 22.

In a preferred embodiment, scanning interferometer 20 is used as an absorption spectrometer, and the radiation from broad band source 22, after modulation by the interferometer, is passed through a sample cell 26 containing the sample to be analyzed. As is well known in the art, scanning interferometer 20 operates in this case as a multiplex scanning monochrometer, illuminating the sample in sample cell 26 with radiation each wavelength of which is modulated at a different frequency. Radiation passing through sample cell 26 is detected and amplified by sample detector and amplifier 28.

For chemical analysis, broad band source 22 is typically an infrared source, while detector and amplifier 28 incorporates an infrared detector, such as a triglycine sulphate (TGS) pyro-electric detector, or the like. After detection and amplification, the signal from broad band source 22 passing through scanning interferometer 20 and sample cell 26 appears as an electrical output signal in the form of an interferogram that, except as hereinafter described in detail, is further processed as is well known in the art, typically with the aid of a dedicated computer (not shown).

Sample detector and amplifier 28 provide a signal to maximum peak detector 30. Maximum peak detector 30 comprises a peak readout memory and a pulse generator so connected as to provide an output pulse each time the readout memory is up dated (i.e., each time the earlier stored signal is exceeded and a new, larger value, sensed and stored). Peak detector 30 is provided with a reset means so that it may be reset, manually or otherwise, to initiate a maximum peak detection sequence. Peak detector 30 is also provided with a disabling means (not shown) to render it inoperative when not required.

Radiation from monochromatic source 24, typically a helium neon (He-Ne) laser in the case of an infrared broad band source 22, after passing through scanning interferometer 20 is detected and amplified by reference detector and amplifier 32. For a helium-neon laser, reference detector and amplifier 32 typically includes a silicon or similar detector. While the path of this reference radiation is preferably clear of sample cell 26, as shown in FIG. 1, it will be understood by those skilled in the art that, depending on the nature of the samples to be confined within sample cell 26, the path between monochromatic source 24 and reference detector and amplifier 32 need not be external to the sample cell.

After detection and amplification, the radiation from monochromatic source 24 modulated by scanning interferometer 20 and detected and amplified by reference detector and amplifier 32 appears as an electrical signal at the output of the reference detector and amplifier. The output of reference detector and amplifier 32 serves as the input of zero-crossing detector 36. Zero-crossing detector 36 may be any of a number of well-known circuits that provide output pulses in response to a varying signal passing through a pre-determined signal level, in this case chosen to be substantially the time average of the signal levels of the varying signal from detector and amplifier 32. The output of the zero-crossing detector 36 is in the form of a train of pulses, each pulse corresponding to the zero condition of the input signal. The output of zero-crossing detector 36 serves as the input of reversible up/down counter 38, the reset signal provided to frequency divider 40, and an input to sequencer 46.

Counter 38 is a reversible up/down counter, the counter being incremented or decremented a unit count by each pulse received from zero-crossing detector 36. The direction of counting of up/down counter 38 is established and reset in response to an external command signal. Counter 38 includes a pulse generator connected so as to provide an output pulse when the accumulated count passes beyond pre-established upper and lower set limits. Each set limit of counter 38 is typically selected to correspond to count at each end of the active scan (i.e., the count limits between which data is collected from the interferometer), typically established, as well known in the art, on the basis of the desired spectral resolution of the instrument, each unit count corresponding to a retardation of ½ wavelength of the radiation from monochromatic source 24.

Divider 40, also connected to the output of zero-crossing detector 36, is also connected to oscillator 42 through zero-crossing detector 44, and functions as a frequency divider, providing a pulse train each pulse of which has a length that is a pre-selected large multiple of the period of the oscillator. Oscillator 42 is a stabilized high frequency oscillator, such as a crystal-driven oscillator, operating at a frequency that is selected to be large compared to the modulation frequency impressed by scanning interferometer 20 on the radiation from monochromatic source 24. For a Michelson interferometer, this latter frequency is equal to the velocity of the moving mirror in scanning interferometer 20 divided by half the wavelength of the radiation from monochromatic source 24. For typical detector and amplifier combinations 28 and 32, the sample and reference beams respectively are preferably modulated in the audio-frequency range (e.g., at a frequency between a few Hertz and a few tens of kiloHertz), and correspondingly oscillator 42 is chosen to have a frequency of a few tens of megaHertz. Zero-crossing detector 44 generates a train of pulses in response to the sinusoidal signal from oscillator 42. Preferably, these pulses correspond to zero crossings of the oscillator's signal.

Frequency divider 40 is any of a number of circuits adapted to provide a gated signal, synchronized with pulses from zero-crossing detector 36, having a pulse length a preselected multiple of the period of oscillator 42. In the preferred embodiment, frequency divider 40 includes a resettable counter with an upper counting limit detector that may be set, on command, to any chosen limit (the "divisor" of frequency divider 40). The count in the counter is reset to zero each time a pulse is received from zero-crossing detector 36. Frequency divider 40 also includes a bistable circuit generating negative-going pulses, triggered by a pulse from zero-crossing detector 36 and reset (i.e., going positive) in response to the detection of the upper limit in the counter.

The divisor in frequency divider 40 is resettable, on command, by sequencer 46. In the preferred embodiment, sequencer 46 is an intermittently operated programed timer that, once initiated (by a signal from counter 38), sequentially resets the divisor in divider 40 by factors of two from a pre-set minimum value (corresponding to a maximum pulse length generated by the divider) to a pre-selected maximum value in a fixed time sequence. Sequencer 46 is provided with a pre-selected maximum divisor corresponding to the lowest desired scan velocity, and selected on the basis of the dynamics of the interferometer system to provide a sufficiently slow velocity to permit the scan to be arrested and its direction reversed within the time interval between zero crossings of the reference signal detected by zero-crossing detector 36. After the sequence reaches the maximum value of the divisor, sequencer 46 initiates a control pulse that is transmitted to drive control 50 and up/down counter 38, and then decrements the divisor, again by factors of two, to a new minimum value. It will be understood that the starting and ending divisors of the sequence provided by sequencer 48 need not be the same, in which event the sequence of changes would be reversed for alternate start commands.

The output of frequency divider 40 serves as the input of averager 48. Averager 48 provides a time average of the negative and positive pulses generated by the divider. The signal from averager 48 is supplied as an error signal to drive control 50.

Drive control 50 comprises the electrical power supply for scan drive 21. Drive control 50 is a reversible power amplifier having an output that may be varied in response to the signal from signal averager 48. Drive control 50 is also responsive to a momentary reverse pulse, as will be described, and is provided with an override control that may be manually or otherwise activated to provide a constant output signal from the scan control to scan drive 21.

The operation of the preferred embodiment will now be described. Initially, the limits of the mirror scan, in terms of half wavelengths of the monochromatic reference source relative to zero retardation, are entered, manually or otherwise, into up/down counter 38. The maximum scan velocities (both direct and retrace), in terms of fractional frequencies of oscillator 42 nearest 4 times the desired modulation frequency of the reference monochromatic radiation, are similarly entered into sequencer 46 as values of the minimum divisors entered into the programed controller.

Before data is collected for processing into a spectrum, the location of zero retardation must be determined, and the corresponding fringe count in counter 38 noted, or, alternatively, the counter zeroed for zero retardation. For this operation, the lower scan limit set into counter 38 is set to a value corresponding to the maximum scan mechanically possible. The override control on drive control 50 is used to power scan drive 21 and the attached mirror to its limit stop in the reverse direction. Maximum peak detector 30 is now enabled and reset, thereby setting up/down counter 38 to zero. Drive control 50 and counter 38 are then started in the forward and up sense, respectively. Monochromatic source 24, also modulated by scanning interferometer 20, is observed by reference detector and amplifier 32. The zero crossings of the amplified signal due to the modulated monochromatic radiation from source 24 are detected by zero-crossing detector 36, the latter providing a sequence of pulses, one for each zero-crossing (both negative and positive going) each pulse indexing counter 38. Simultaneously, the interferometrically modulated signal due to broad band source 22 (observed, if desired, without a sample in sample cell 26) is, after amplification, supplied to maximum peak detector 30. As each maximum of this signal is sensed by peak detector 30, its value is compared with the previously stored maximum (initially zero), and if larger, replaces it and causes a pulse to be transmitted to counter 38, resetting the counter to zero. At the completion of the scan, the peak stored in peak detector 30 is the largest peak (corresponding to zero retardation), and the counter, set when this maximum was sensed by the peak detector, has been set to register zero (within a half wave of zero retardation as measured by the reference monochromatic radiation). The override of drive control 50 may now be released, and maximum peak detector 30 may be disconnected or otherwise inhibited, and the desired minimum scan limit entered manually into counter 38.

Without an override signal, drive control 50 is responsive to the error signal supplied by signal averager 48. The initial setting of sequencer 46 has supplied a minimum divisor, corresponding to the maximum desired forward scan velocity, to frequency divider 40. Divider 40 is consequently supplying a train of negative-going pulses, each at a time duration equal to the time required to move the mirror of scanning interferometer 20 through a quarter wavelength of the reference radiation at the desired velocity, in synchronization with each zero-crossing (observed half wave movement) of the reference signal detected by zero-crossing detector 36. Signal averager 48 time averages the pulse train from divider 40, providing a negative signal if the duration of the negative pulse is longer than that of the positive, and vice versa. These two conditions correspond to modulations of the reference monochromatic radiation by the intereferometer respectively at greater than and less than half the frequency established by oscillator 42 and frequency divider 40. If the monochromatic reference beam is modulated by the interferometer such that its modulation period is four time the pulse length of the pulse produced by frequency divider 40, the negative and positive portions of the pulse train are of equal duration, and the output signal from signal averager 48 is zero. The output signal from signal averager 48 is supplied to drive control 50, a positive signal increasing the power supplied by drive control 50 to scan drive 21, and a negative signal, decreasing the power. Scan drive 21 is thus accelerated or decelerated accordingly as the modulation of the reference monochromatic radiation by the interferometer is at a lower or higher frequency than half that established by oscillator 42 and frequency divider 40.

As the initial scan moves the mirror of interferometer 20 beyond the upper retardation limit set into counter 38, counter 38 transmits a start signal to sequencer 46, initiating a control cycle. Sequencer 40, initially set to provide the divisor to frequency divider 40 appropriate for the maximum forward scan velocity, begins to cycle, sequentially supplying larger divisors to frequency divider 40. Accordingly, the negative pulses supplied by divider 40 become longer. Signal averager 38 momentarily sees the negative pulse longer than the positive, and accordingly provides a negative (deceleration) signal to drive control 50. The control sequence is continued, the time interval between successive signals from sequencer 46 being chosen preferably to slightly exceed the time required for the servo loop to stabilize at the new velocity after each change of divisor. After sequencer 46 passes through the maximum preselected divisor (corresponding to the lowest desired scan rate), a reverse pulse is transmitted by the sequencer to drive control 50 and counter 38 coincident with the arrival at the sequencer of a pulse from zero-crossing detector 36. The reverse pulse reverses the polarilty of the signal from drive control 50 and supplies a momentary impulse through the drive control to scan drive 21, thereby accelerating the scan drive in the reverse (retrace) direction. Simultaneously, the counting sense of up/down counter 38 is reset by the pulse. As the mirror moves in the reverse direction, the reference beam is modulated by a decreasing path length difference, reference detector and amplifier 32 and zero-crossing detector 36 now supplying a train of pulses to counter 38, the counter now counting down from its maximum count.

Meanwhile, sequencer 46 is now supplying a sequence of divisors, now growing smaller, to frequency divider 40, thereby decreasing the pulse length of the negative going pulse generated by the divider. Signal averager 48 now momentarily sees a shorter negative pulse relative to the positive pulse, and accordingly supplies a positive signal, momentarily increasing the (reversed) signal from drive control 50. Scan drive 21 is thereby accelerated in the reverse (retrace) direction. As sequencer 46 continues its cycle, it continues to update the divisor in frequency divider 40 to a lower value. The resulting pulse length of the negative-going pulse generated by the divider continues to decrease. Eventually, sequencer 46 reaches the end of its cycle, updating the divisor in frequency divider to the lowest return scan value. Scan drive 21 accordingly has been accelerated and locked to the pre-established retrace velocity entered into sequencer 46.

Scan drive 21 continues in the reverse direction, and the fringe count of the modulated monochromatic reference beam supplied counter 38 by zero-crossing detector 38 continues to decrement, eventually passing through the reverse scan position limit previously set in the counter. Counter 38 then transmits an end scan signal, inititiating a recycling of sequencer 46, and, as will be understood by those skilled in the art, providing a status signal to the spectral data processing system (not shown) in order to provide a position marker, if desired. Sequencer 46 now reverses the sequence used to accelerate the reverse scan, updating frequency divider 40 with larger and larger divisors and consequently decelerating the mirror. When sequencer 46 has updated the frequency divisor to a value high enough to decelerate the mirror to a velocity (pre-established from the dynamics of the system and the available power) sufficiently low that the direction of travel of the mirror may be reversed within a quarter of a wave of the monochromatic reference radiation, the sequencer produces a reverse pulse, triggered by the next observed zero crossing of a reference fringe seen by zero-crossing detector 36. This reverse pulse reverses the polarity of the signal produced by drive control 50, momentarily produces a drive pulse sufficient to reverse the direction of travel of scan drive 21, and simultaneously resets the sense of up/down counter 38. The direction of travel of scan drive 21 is reversed before it can travel far enough in the retrace direction to produce the next zero-crossing of the monochromatic reference signal, the next observed zero-crossing being produced by a forward going (direct) scan, and incrementing counter 38.

Sequencer 46 continues its cycle, now step-wise decreasing the divisor in frequency divider 40, thereby accelerating scan drive 21 through the feedback loop including signal averager 48, as previously described with reference to the reverse scan. Eventually, sequencer 46 reaches the end of its cycle, having updated the divisor in frequency divider 40 to the minimum value corresponding to the previously set forward scanning velocity.

Preferably, the sequence to accomplish this acceleration to maximum forward velocity is accomplished before the count in counter 38 increases above the minimum value marking the reverse scan limit, in order that the scan between scan limits may be accomplished at substantially constant velocity. To this end, the timing of the deceleration sequence by sequencer 46 at the end of the retrace may be protracted to provide sufficient time to accelerate the forward-going direct trace motion.

As the upward moving count in counter 38 passes the preset value marking the desired lower end of the desired scan range, a status signal is transmitted marking the start of the scan. The scan continues until the count in counter 38 reaches the preset upper scan limit, where the counter initiates an upper scan limit status signal and initiates the reverse cycle of sequencer 46, and produces an upper scan limit status signal.

The controlled deceleration of scan drive 21 and the attached scanning mirror makes it possible to reverse the direction of travel of the drive and mirror in a distance short in comparison to the wavelength of the monochromatic reference radiation. In the case of a scanning Michelson interferometer zero-crossing detection of the modulated reference beam signal provides clocking pulses a half wave retardation apart, the mirror having moved a quarter of a wavelength. By reversing the mirror motion within a quarter of a wavelength, and simultaneously changing the counting direction in counter 38, successive pulses are properly tallied, there being no ambiguity as to the direction the mirror was moving at the instant the pulse was generated.

Aside from relaxing the requirement that the zero retardation point be observed each scan, thereby allowing a less complicated optical system (e.g., no reference interferometer or dual phase reference source is required), the positive control of the moving mirror allows better use of the time available for observation. As a white light burst is not required each scan, the retrace need not extend sufficiently beyond zero retardation to insure peak detection, as otherwise necessary. The count stored in counter 38 serves to positively measure the retaradation at every position of the scan, regardless of direction of motion. Accordingly, intensity data may be accurately accorded retardation information on both direct scan and retrace.

It will be appreciated that the embodiment herein described in detail may be modified without departing from the principles of the invention. Thus, frequency divider 40 and signal averager 48 may be replaced by other means, well known in the art, for producing a velocity error signal responsive to a comparison of a pair of frequencies. Then, too, sequencer 46, preferably a time sequenced controller, may be made responsive to the velocity error signal, changing the divisor as soon as the velocity error produced by the previous divisor reaches zero. Clearly, also, the signal processing involved in the system control may be performed digitally with an appropriately programmed computer, rather than with a mixture of digital and analog components. Then again it will be realized the invention may be used to control the scan of reciprocating elements in interferometers other than Michelson interferometers.

Since these and other changes may be made in the apparatus and its method of use without departing from the scope of the invention herein involved, it is intended that all matter contained in the above description or shown in the accompanying drawing shall be interpreted in an illustrative and not a limting sense.

What is claimed is:

1. A system for controlling cyclic excursions of optical path length in a scanning interferometer including means for providing a beam of substantially monochromatic radiation traversing said interferometer, which beam is cyclically modulated by said excursions, said system comprising, in combination:

means for detecting said radiation and for generating a signal responsively to modulation of said beam;

means for detecting predetermined like conditions of said signal in substantially each cycle of said modulation and for generating a pulse for each said condition detected;

comparison means for comparing time intervals between successive said pulses with a temporal period selected from a pre-established ordered sequence of temporal periods, said comparison means being capable of providing an error signal dependent on the comparison of said intervals and said period by said comparison means;

scan drive means for controlling the velocity of said excursions responsively to said error signal, said scan drive means further including means for reversing the direction of motion of an excursion responsively to a command signal;

means for counting said pulses, said means for counting including means for reversing the direction of counting responsively to a trigger signal; and sequencing means responsive to a predetermined count in said means for counting, so as to sequentially alter said temporal period in accordance with said ordered sequence of temporal periods, said sequencing means further providing said command signal and said trigger signal at predetermined periods in said sequence, whereby said excursions are controlled by detections of said modulation of said beam so as to reverse the direction of excursion motion within less than a half of cycle of said modulation.

2. A system according to claim 1 further including:

means for resetting said means for counting to a pre-established count responsive to a setting signal;

means of generating a broad-band signal having a level dependent on the intensity of broad-band radiation traversing said interferometer and modulated by said excursions of optical path length;

means for detecting peaks of said broad-band signal;

means for comparing the level of said peaks with a previously stored level, said means for comparing further storing the larger of the compared levels; and means for generating said setting signal when the value of the stored level is altered.

* * * * *